(12) United States Patent
Wei et al.

(10) Patent No.: US 11,445,168 B1
(45) Date of Patent: Sep. 13, 2022

(54) CONTENT-ADAPTIVE VIDEO SAMPLING FOR COST-EFFECTIVE QUALITY MONITORING

(71) Applicant: Amazon Technologies, Inc., Seattle, WA (US)

(72) Inventors: Hai Wei, Seattle, WA (US); Charles Benjamin Waggoner, Portland, OR (US); Zongyi Liu, Redmond, WA (US); Srinivas Rajagopalan, Seattle, WA (US); Lei Li, Yarrow Point, WA (US)

(73) Assignee: Amazon Technologies, Inc., Seattle, WA (US)

( * ) Notice: Subject to any disclaimer, the term of this patent is extended or adjusted under 35 U.S.C. 154(b) by 71 days.

(21) Appl. No.: 17/039,349

(22) Filed: Sep. 30, 2020

(51) Int. Cl.
*H04N 17/00* (2006.01)
*G06K 9/62* (2022.01)
*G06T 7/00* (2017.01)
*G06V 20/40* (2022.01)

(52) U.S. Cl.
CPC .......... *H04N 17/00* (2013.01); *G06K 9/6256* (2013.01); *G06T 7/0002* (2013.01); *G06V 20/46* (2022.01); *G06T 2207/10016* (2013.01); *G06T 2207/20081* (2013.01); *G06T 2207/30168* (2013.01)

(58) Field of Classification Search
CPC .... H04N 17/00; G06K 9/6256; G06T 7/0002; G06T 2207/10016; G06T 2207/20081; G06T 2207/30168; G06V 20/46
See application file for complete search history.

(56) References Cited

U.S. PATENT DOCUMENTS

| | | | | |
|---|---|---|---|---|
| 6,418,242 B1 * | 7/2002 | Maurer | ............... | H04N 19/527 |
| | | | | 358/1.9 |
| 2010/0260270 A1 * | 10/2010 | Kapoor | ................. | H04N 19/46 |
| | | | | 375/E7.2 |
| 2013/0322242 A1 * | 12/2013 | Swenson | ............ | H04L 43/0882 |
| | | | | 370/252 |

(Continued)

*Primary Examiner* — Michael E Teitelbaum
(74) *Attorney, Agent, or Firm* — Nicholson De Vos Webster & Elliott LLP

(57) ABSTRACT

Techniques for content-adaptive video sampling for automated video quality monitoring are described. As one example, a computer-implemented method includes receiving a request to train a machine learning model on a training video file comprising at least one labeled defect, performing an encode on the training video file to generate one or more compression features for each compressed frame of the training video file, training the machine learning model to identify a proper subset of candidate defect frames of the training video file based at least in part on the one or more compression features for each compressed frame of the training video file and the at least one labeled defect, receiving an inference request for an input video file, performing an encode on the input video file to generate one or more compression features for each compressed frame of the input video file, generating, by the machine learning model, a proper subset of candidate defect frames of the input video file based at least in part on the one or more compression features for each compressed frame of the input video file, and determining a defect in the input video file based at least in part on the proper subset of candidate defect frames of the input video file.

20 Claims, 10 Drawing Sheets

(56) References Cited

U.S. PATENT DOCUMENTS

| | | | | |
|---|---|---|---|---|
| 2017/0041021 | A1* | 2/2017 | Kärkkäinen | H03M 7/3084 |
| 2019/0273925 | A1* | 9/2019 | Babbar | H04N 19/44 |
| 2021/0037182 | A1* | 2/2021 | Han | H04L 67/10 |
| 2021/0142068 | A1* | 5/2021 | Aliamiri | G06V 10/76 |
| 2021/0350515 | A1* | 11/2021 | Hoegen | G06T 5/20 |

* cited by examiner

CONTENT-ADAPTIVE VIDEO SAMPLING FOR COST-EFFECTIVE QUALITY MONITORING

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the drawings, in which.

DETAILED DESCRIPTION

Figure 1:
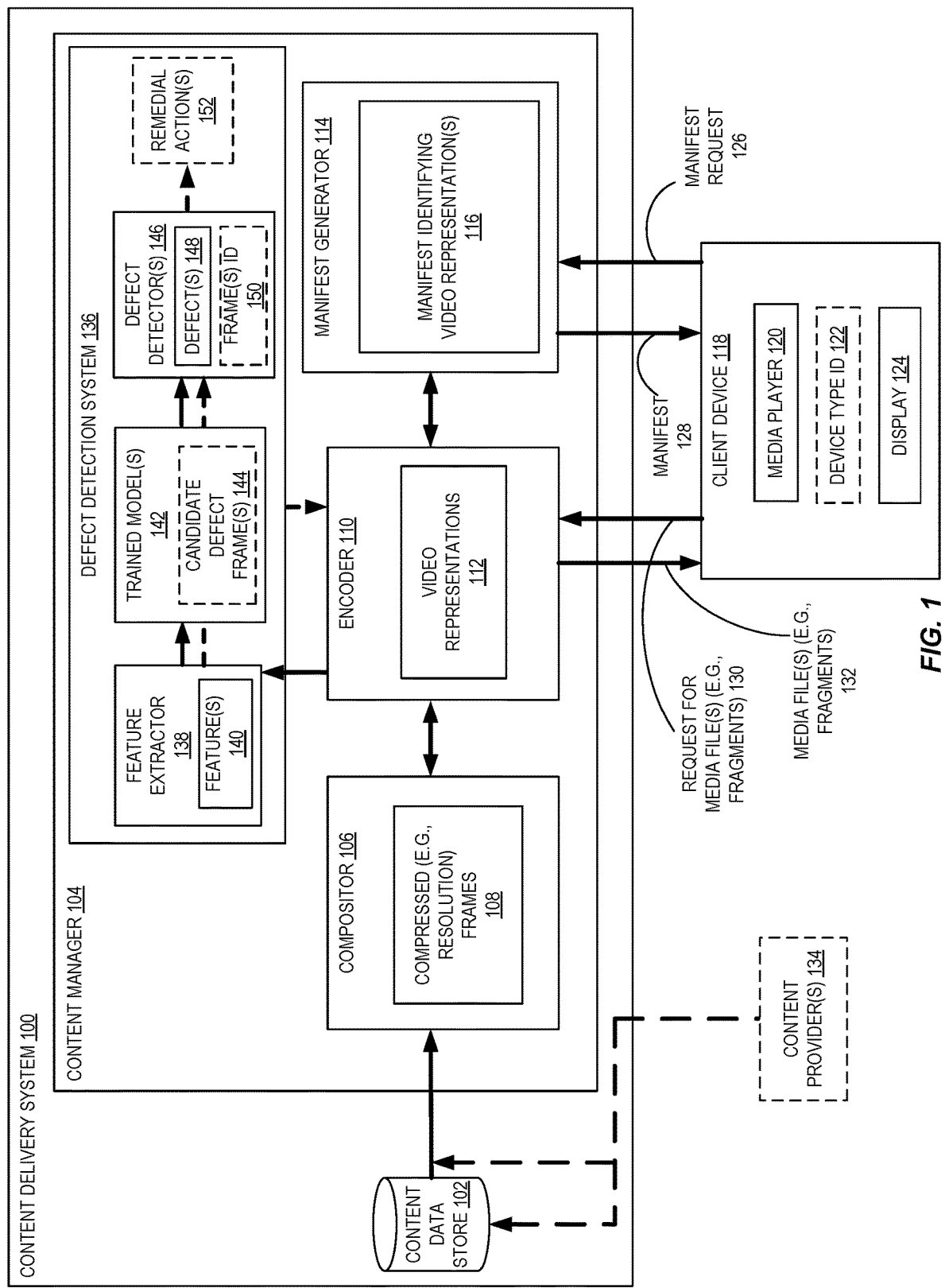
FIG. 1 is a diagram illustrating an environment including a content delivery system having a defect detection system according to some embodiments.

Various embodiments of methods, apparatuses, systems, and non-transitory computer-readable storage media for content-adaptive video sampling for (e.g., automated) video quality monitoring are described. According to some embodiments, a content delivery system includes a defect detection system (or service) that utilizes a machine learning model to extract a representative subset of video frames for defect detection. Certain embodiments herein are directed to a content-adaptive video sampling system that comprises a fast complexity-measuring encoding, representative scene frame extraction (e.g., for supporting global defect detection), and defect-specific frame sampling (e.g., for supporting local defect detection), e.g., based on heterogeneous video frame features including, but not limited to, bit costs/complexity, frame-level encoding types, block-level encoding modes, spatial characteristics, and/or temporal characteristics.

In certain embodiments, a content delivery system (e.g., as a video streaming service for live and/or video on demand titles) implement defect detection to proactively look for potential (for example, local and/or global) video defects at multiple checkpoints along a content delivery pipeline to safeguard a high quality video streaming experience for users (e.g., customers). In certain embodiments, defect detection (and quality assessment) use (e.g., deep) machine learning models with numerous amounts of model parameters (e.g., in the order of tens or hundreds of millions). Implementing these models are (e.g., computationally) expensive and often require high-end workstations or cloud-based machines with graphics processor unit (GPU) capability, powerful central processing unit (CPU) capability, and sufficient memory and networking capabilities. Running these defect detection models for numerous (e.g., millions) of video files (e.g., video on demand titles, live events, and (e.g., 24 hours a day and 7 days a week) live linear channels become prohibitively costly in compute, storage, and networking resources and unfeasible to scale up.

There are various types of video defects, which can be broadly categorized into global defects (e.g., in which substantially every video frame is affected) and local defects (e.g., where only a proper subset of frames, partial frames, or local areas within frames are affected). Furthermore, certain different defects have different root causes and can be correlated to spatial, temporal, and frequency characteristics of video contents. Utilizing this categorization and correlation (e.g., between defect types and video content characteristics), embodiments herein are directed to a novel system and method of efficiently processing video content and intelligently extracting a representative proper subset of video frames for defect detection. Embodiments of the proposed system and method are suitable for live video streaming and video on demand applications, and can be implemented to greatly reduce the compute, storage, and networking costs of a (e.g., live) video monitoring service (e.g., live video quality monitoring), while maintaining a high accuracy of detection performance Embodiments herein enable a video monitoring service (e.g., defect detection service) to scale properly as the video catalog, live events, and/or linear channels increase exponentially.

In one embodiment, the defect detection system (e.g., including content-adaptive video sampling system) comprises a fast complexity-measuring encoding module, representative scene frame extraction (e.g., for supporting global defect detection), and defect-specific frame sampling modules (e.g., for supporting local defect detection), e.g., based on heterogeneous video frame features including bit costs/complexity, frame-level encoding types, block-level encoding modes, as well as spatial and temporal characteristics. Depending on the system design choice, the defect detection (e.g., content-adaptive video sampling) can be customized and implemented to achieve various system goals, e.g., to (1) minimize compute cost, (2) minimize storage and networking costs, (3) maximize defect detection throughput and response speed, and/or (4) a combination of different system goals.

FIG. 1 is a diagram illustrating an environment 101 including a content delivery system 100 having a defect detection system 136 according to some embodiments. The depicted content delivery system 100 includes a content data store 102, which may be implemented in one or more data centers. As one example, a media file (e.g., a video) that is to be processed (e.g., encoded for playback by a client device 118) is accessed from the content data store 102 by content manager 104. In certain embodiments, compositor 106 receives a media file (e.g., a video) and a request to change the scale (e.g., downscale by a given value (e.g., percentage)) and forms compressed (e.g., resolution) frame(s) 108 therefrom. In one embodiment, the compressed frames are at a lower resolution (e.g., between 540p and 720p) than the source file, e.g., source video from content providers 134, which may include a live stream of the source video in certain embodiments.

In one embodiment, the encoder 110 is to then encode the scaled frames 108 of the media file into one or a plurality of video representations 112 (e.g., streams), for example, as a spatial down-sampling (e.g., to a lower resolution) and/or a full encode (e.g., a fast video encoding of the down-sampled video for feature generation). In certain embodiments, the encoding compresses one or more frames of the input video file into a video representation (e.g., at a certain resolution). In certain embodiments, one or more (e.g., compression) features 140 about the video file are determined (e.g., extracted), e.g., as the compression itself is already occurring as part of an encoding (e.g., compression) by encoder 110.

In FIG. 1, defect detection system 136 includes a feature extractor 138 to determine (e.g., extract) one or more features 140 of a video file, e.g., the video file being encoded by encoder 110. Features 140 may include, but are not limited to, bit costs/complexity, frame-level encoding types, block-level encoding modes, spatial characteristics, and/or temporal characteristics (e.g., with a corresponding value for each frame of the video file). Features may include, but are not limited to, bit stream level features from an encoding and/or encoder log level features from an encoding. Encoder log level features (e.g., obtained from encoder log data) may include, but are not limited to, (i) objective metrics (for example, peak signal-to-noise ratio (PSNR), structural similarity index measure (SSIM), and/or a perceptual video quality assessment (e.g., Video Multimethod Assessment Fusion (VMAF)), e.g., for luma and/or chroma channels, (ii) distortion and energy metrics used by the encoder (e.g., with correction for frame size or otherwise normalized), (iii) metrics used for frame type decision, (iv) frequency of different block types and sizes, (v) range and distribution of source and/or output luma and chroma values (e.g., min, mean, max), or (vi) any combination thereof. Features 140 may be sent to trained model(s) 142 and/or defect detector(s) 146 (e.g., without being input into the trained model(s) 142).

Depicted detection system 136 includes a trained (e.g., machine learning) model(s) 142. The creation and training of model(s) 142 is discussed herein, e.g., in reference to FIG. 3. In certain embodiments, the trained model 142 determines one or more candidate defect frames 144 based on the extracted features 140, for example, a first subset of candidate defect frames for a first category of defect, a second subset of candidate defect frames for a second category of defect, etc. In one embodiment, defect detection system 136 includes a first trained model 142 that outputs a first subset of candidate defect frames 144 for a first category of defect from one or more of the features 140, a second trained model 142 that outputs a second subset of candidate defect frames 144 for a second category of defect from one or more of the features 140, etc. In certain embodiments, candidate defect frames 144 (e.g., for a same category of defect) include a plurality of frames that are not adjacent, e.g., they may be frames (of frames starting at 1) of frame 2, frame 5, frame 8, etc. In certain embodiments, candidate defect frames 144 include at least one frame this is not an intra-coded picture, e.g., not an I-frame. In certain embodiments, the trained (e.g., machine learning) model 142 outputs a frame identification value and a defect probability value (e.g., on a scale from 0 to 1) for candidate defect frames 144 of the input video file (e.g., outputs these values for each frame of the proper subset of candidate defect frames of the input video file).

Depicted detection system 136 includes one or more defect detector(s) 146 to detect one or more defects 148 in video file, e.g., based on the candidate defect frames 144. In certain embodiments, a defect detector is a machine learning model trained to determine probable defects 148 in a video file. Defect detector 146 may output a defect, e.g., along with an identification 150 of the one or more frames (e.g., a proper subset of the candidate defect frames 144) that correspond to that particular defect. In one embodiment, defect detector 146 may also analyze the entire video file in its original version, e.g., before it was encoded by encoder 110.

In certain embodiments, when the defect detection system 136 determines one or more defects 148 are present within the video file, a remedial action 152 may be triggered. For example, for certain issues (e.g., aliasing), the remedial action 152 may be re-encoding the input video file, e.g., and then repeating the compression, encoding, defect detection, etc., again. For example, for certain issues (e.g., corruption of the file), the remedial action 152 may be requesting another copy of the input video file from a content provider 134.

In certain embodiments, when the defect detection system 136 determines one or more defects 148 are not present within the video file (or any defects do not exceed a defect threshold as discussed below in reference to FIG. 2), the video representation 112 of the input video file may then be (e.g., automatically) approved for use by a client device 118, e.g., via allowing manifest generator 114 to generate a manifest 116 for that video file (e.g., a media file that includes the encoded video file).

Note, in certain embodiments, it may be unrealistic to encode the media file into an almost boundless number of video representations. Instead, embodiments herein generate a manifest of the available video representations (e.g., stored in content delivery system 100) and form a set of manifests 116 identifying the available video representations, e.g., for playing by a media player 120 of a particular client device 118 (e.g., based on the client device's display 124 resolution). In certain embodiments, the content is stored in the content delivery system 100 in two parts: (i) the manifest of all available video representations (e.g., their URL addresses and, optionally, other characteristics, and (ii) the video representations (e.g., stream of segments) in a single or multiple files. In one embodiment, a client device 118 is to read (or store) a manifest before the client device may make a request for the media from that manifest.

Client device 118 includes a media player 120 (e.g., to play media streams) and a display 124 to show the video of the media file (e.g., video file). Client device 118 may include storage that stores a device type identification (DTID) value 122 to indicate the client device's (e.g., maximum) resolution of its display 124.

As one example, a client device 118 sends a manifest request 126 for a manifest of a media file (e.g., video file) of content delivery system 102. In certain embodiments, receipt of manifest request 126 causes manifest generator to determine the device resolution (e.g., from a field of device type ID 122, and thus send back a manifest 128 identifying media file(s), e.g., the one or more video representations for that particular device based on that device resolution. Client device 118 may send a request 130 for a media file(s) (e.g., as identified by the manifest 128) and then receive the media file(s) 132, e.g., from content delivery system 100.

Figure 2:
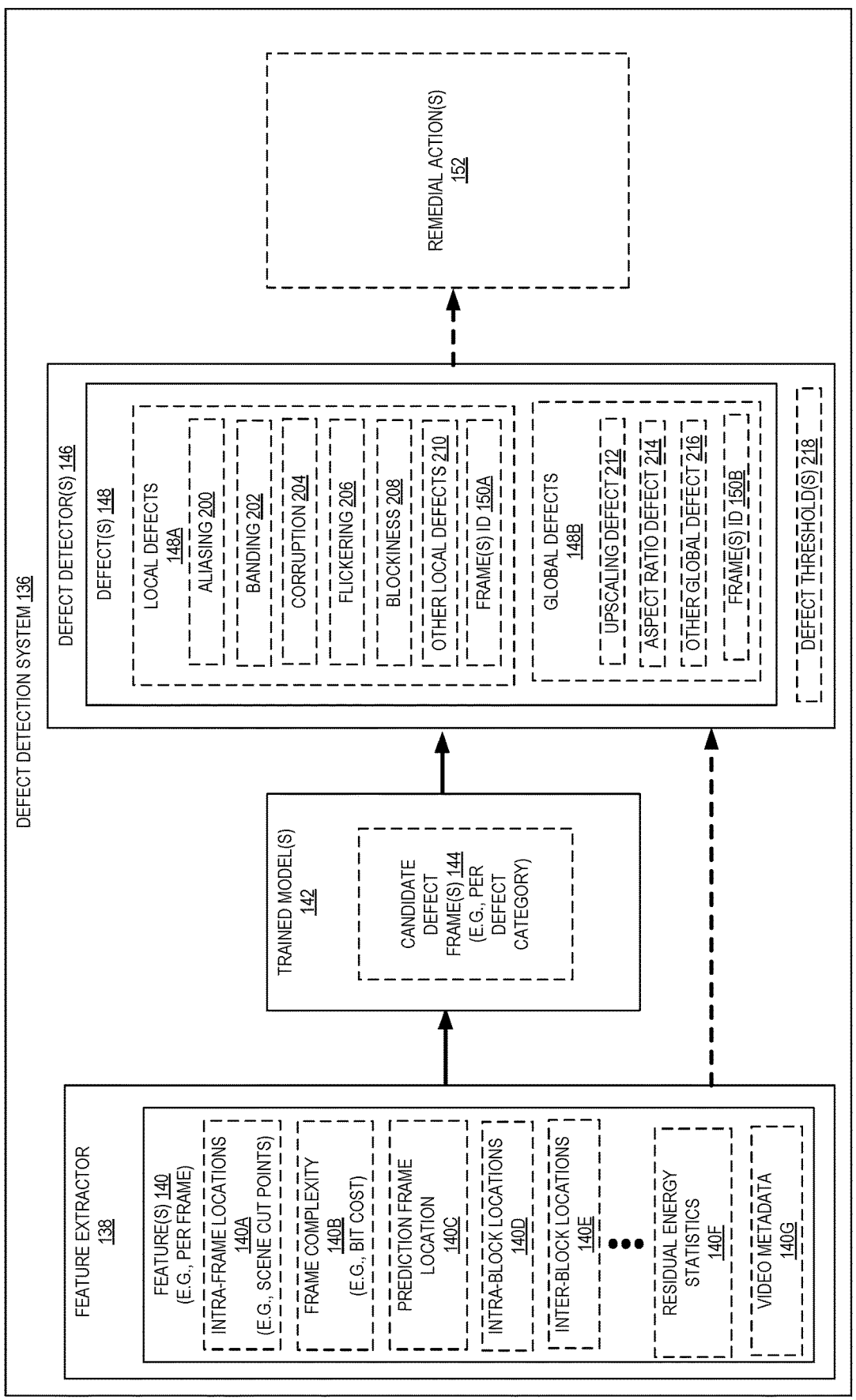
FIG. 2 is a diagram illustrating a defect detection system according to some embodiments.

FIG. 2 is a diagram illustrating defect detection system 136 according to some embodiments. Depicted defect detection system 136 includes a feature extractor 138 to determine (e.g., extract) one or more features 140 of a video file, e.g., the video file being encoded by encoder 110. Features 140 may include, but are not limited to, bit costs/complexity, frame-level encoding types, block-level encoding modes, spatial characteristics, and/or temporal characteristics (e.g., with a corresponding value for each frame of the video file). Features 140 may be sent to trained model(s) 142 and/or defect detector(s) 146 (e.g., without being input into the trained model(s) 142). Encoding may compress a video file into a plurality of compressed frames, for example, one or more an intra-coded picture frames (I-frames) (e.g., with each I-frame as a complete image), one or more predicted picture frames (P-frames or delta-frames) (e.g., with each P-frame having only the changes in the image from the previous frame), and/or one or more bidirectional predicted picture frames (B-frames) (e.g., that further saves space (e.g., bits) by using differences between the current frame and both the preceding and following frames to specify its content). For example, with P-frames and B-frames being inter-coded pictures. In one embodiment, each single I-frame includes a plurality of inter-coded frames (e.g., P-frames and/or B-frames), e.g., as a group of pictures (GOP).

Possible features include, intra-frame locations 140A (e.g., scene cut points), frame complexity 140B (for example, bit cost, e.g., number of bits total in a frame), prediction frame location 140C, intra-block locations 140D, inter-block locations 140E, residual energy statistics 140F (for example, from inter-frame predictions, e.g., from encoding logs), video metadata 140G (e.g., is the video file an interlaced scan format or a progressive scan format), or any combination thereof. For example, extracting (e.g., tracking) features 140 on a per frame basis for each (e.g., compressed) frame of a video file (e.g., a single video title).

Depicted detection system 136 includes a trained (e.g., machine learning) model(s) 142, e.g., with one model per feature category (e.g., any one of features 140A-140G) and/or per defect category (e.g., any one of local defects 200-210). In certain embodiments, the trained model 142 determines one or more candidate defect frames 144 based on the extracted features 140, for example, a first subset of candidate defect frames for a first category of defect, a second subset of candidate defect frames for a second category of defect, etc. In one embodiment, defect detection system 136 includes a first trained model 142 that outputs a first subset of candidate defect frames 144 for a first category of defect from one or more of the features 140, a second trained model 142 that outputs a second subset of candidate defect frames 144 for a second category of defect from one or more of the features 140, etc. In certain embodiments, candidate defect frames 144 (e.g., for a same category of defect) include a plurality of frames that are not adjacent, e.g., they may be frames (of frames starting at 1) of frame 2, frame 5, frame 8, etc. In certain embodiments, candidate defect frames 144 include at least one frame this is not an intra-coded picture, e.g., not an I-frame.

Depicted detection system 136 includes one or more defect detector(s) 146 to detect one or more defects 148 in video file, e.g., based on the candidate defect frames 144. In certain embodiments, a defect detector is a machine learning model trained to determine probable defects 148 in a video file. Defect detector 146 may output a defect, e.g., along with an identification 150 of the one or more frames (e.g., a proper subset of the candidate defect frames 144) that correspond to that particular defect. In one embodiment, defect detector 146 may also analyze the entire video file in its original version, e.g., before it was encoded by encoder 110.

Defect detector(s) 148 may include a (e.g., single or respective plurality of) detectors for local defects 148A and/or global defects 148B. Local defects 148A may include, aliasing 200, banding 202, corruption 204, flickering 206, blockiness 208, other local defects 210, or any combination thereof. Local defects 148A may be detected by defect detector(s) 146 (e.g., a local defect detector), taking as its input, an output of candidate defect frame(s) 144 from trained machine learning model 142 based on an input into the trained model 142 of any combination of the feature categories 140A-140G, e.g., all of them. Location of the local defects 148A (e.g., each local defect) may be identified by corresponding frame(s) ID 150A. Global defects 148B may include, upscaling defect 212, aspect ratio defect 214, other global defects 216, or any combination thereof. Global defects 148B may be detected by defect detector(s) 146 (e.g., a global defect detector), taking as its input any combination of the feature categories 140A-140G, e.g., only intra-frame locations 140A (e.g., scene cut points) and/or video metadata 140G. Location of the global defects 148B (e.g., each global defect) may be identified by corresponding frame(s) ID 150B.

In certain embodiments, when the defect detection system 136 determines one or more defects 148 are present within the video file, a remedial action 152 (e.g., a defect specific remedial action) may be triggered. For example, for certain issues (e.g., aliasing), the remedial action 152 may be re-encoding the input video file, e.g., and then repeating the compression, encoding, defect detection, etc., again. For example, for certain issues (e.g., corruption of the file), the remedial action 152 may be requesting another copy of the input video file from a content provider 134.

In certain embodiments, when the defect detection system 136 determines one or more defects 148 are not present within the video file or any defects do not exceed defect threshold(s) 218, the video representation 112 of the input video file may then be (e.g., automatically) approved for use by a client device 118, e.g., via allowing manifest generator 114 to generate a manifest 116 for that video file (e.g., a media file that includes the encoded video file). In one embodiment, each defect category includes its own defect threshold 218, e.g., as selected before defect detection.

Figure 3:
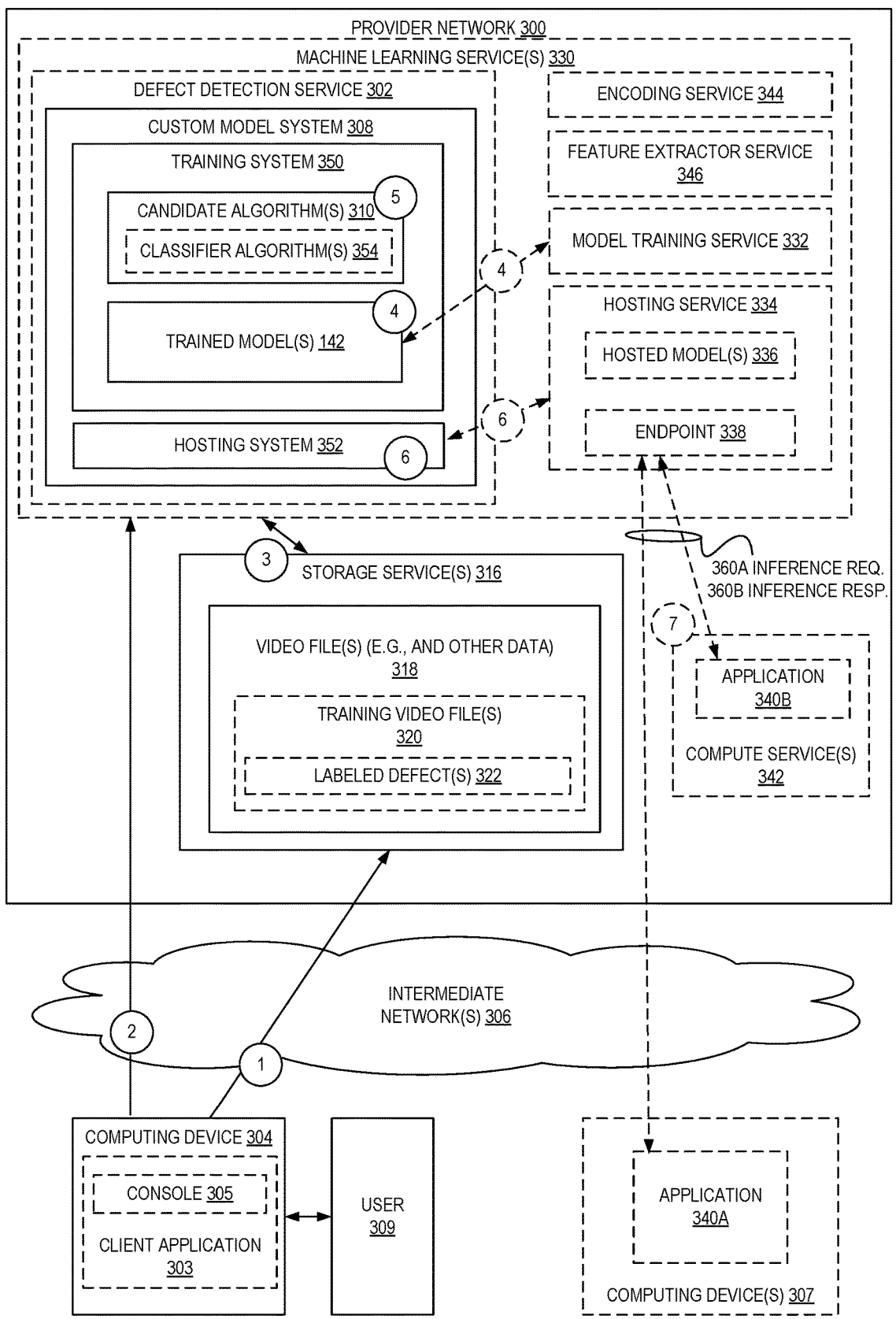
FIG. 3 is a diagram illustrating an environment for creating, training, and using a machine learning model according to some embodiments.

FIG. 3 is a diagram illustrating an environment for creating, training, and using a machine learning model according to some embodiments. FIG. 3 includes a defect detection service 302, one or more storage services 316, one or more machine learning services 330, one or more encoding services 344, one or more feature extractor services 346, and one or more compute services 342 implemented within a multi-tenant provider network 300. Each of the defect detection service 302, one or more storage services 316, one or more machine learning services 330, and one or more compute services 342 may be implemented via software, hardware, or a combination of both, and may be implemented in a distributed manner using multiple different computing devices.

A provider network 300 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 342), a storage service 316 that can store data objects (such as video files 318), etc. The users (or "customers") of provider networks 300 may utilize one or more user accounts that are associated with a customer account, though these terms may be used somewhat interchangeably depending upon the context of use. Users may interact with a provider network 300 across one or more intermediate networks 306 (e.g., the internet) via one or more interface(s), such as through use of application programming interface (API) calls, via a console 305 implemented as a website or application, etc. The interface(s) may be part of, or serve as a front-end to, a control plane of the provider network 300 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 300 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 300 by an on-demand code execution service (which may be one of compute service(s) 342) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions (e.g., as an application 340B) that can be executed on demand, without requiring the user to maintain dedicated infrastructure to execute the serverless function. Instead, the serverless functions can be executed on demand using resources maintained by the provider network 300. In some embodiments, these resources may be maintained in a "ready" state (e.g., having a pre-initialized runtime environment configured to execute the serverless functions), allowing the serverless functions to be executed in near real-time.

The defect detection service 302, in some embodiments, is a machine learning powered service that makes it easy for users to build and use trained model(s) 142, e.g., to build and use a trained model 142 that infers candidate defect frame(s) 144 based on an input into the trained model 142 of any combination of features (e.g., compression features), for example, features 140, and/or to build and use a defect detector model, e.g., as defect detector(s) 146.

The custom model system 308, for example, may enable users to generate trained models 142 from candidate algorithms 310, e.g., including one or more classifier algorithms 354 (e.g., multi-class classifier). Embodiments herein allow a customer to create trained models 142 by supplying data, e.g., training video files 320 (e.g., with labeled defects 322). Data 318 may include (e.g., labeled) training data and/or evaluation data.

At a high level, machine learning may include two major components that are required to be put in place in order to expose advertised functionality to the customer: (i) training (e.g., by training system 350) and (ii) inference. Training may include the following responsibilities: training data analysis; data split (training, evaluating (e.g., development or validation), and/or testing data); model selection; model training; model evaluation; and status reporting. Inference may include the following responsibilities: model loading and hosting; and inference (e.g., synchronous and batch).

Training may include training a plurality of candidate models 310 and respective configurations (e.g., coefficients and/or hyperparameters). Training may perform a grid search over the matrix of experiments (e.g., defined upfront) in search for the model and its parameters (e.g., hyperparameters) that performs best on the given dataset.

Thus, a user 309 may provide or otherwise identify data 318 (e.g., training video files 320 and/or labeled defects 322) for use in creating a custom model. For example, as shown at circle (1), the user 309 may utilize a client application 303 executed by a computing device 304 (e.g., a web-application implementing a console 305 for the provider network 300, a standalone application, another web-application of another entity that utilizes the time series forecast service 302 as a part of its backend, a database or mixed-SQL environment, etc.) to cause the computing device 304 to upload the video file(s) 318 to a storage location (e.g., provided by a storage service 316 such as an object storage service of a provider network 300).

The data 318 may be a video file and a columnar dataset that includes rows (or entries) of data values, where the data values may be arranged according to one or more columns (or attributes) and may be of a same datatype (e.g., one storing text). In some cases, the data 318 includes headings or other metadata describing names or datatypes of the columns, though in some cases this metadata may not exist. For example, some or all of the data 318 may have been provided by a user as a plaintext file (e.g., a comma-separated values (CSV) or tab-separated values (TSV) file), an exported database table or structure, an application-specific file such as a spreadsheet, etc.

For example, when a user 309 desires to train a candidate algorithm 310 (e.g., classifier algorithm 354), this file (or files) may be a CSV with at least two values per row—e.g., one column storing defect label, such as one of defects 148 in FIG. 2, and another column storing the a frame ID that indicates the corresponding frame(s) for that defect label, e.g., "defect,frames".

Thereafter, at circle (2) the computing device 304 may issue one or more requests (e.g., API calls) to the machine learning service 330 that indicate the user's 309 desire to train one or more candidate algorithms 310 into one or more trained models 142. The request may be of a type that identifies which type of model(s) are to be created or identifies that the machine learning service 330 itself is to identify the candidate algorithms(s) 310. The request may also include one or more of an identifier of a storage location or locations storing the data 318 (e.g., an identifier of the training video files 320 and/or defect labels 322), which may identify a storage location (e.g., via a Uniform Resource Locator (URL), a bucket/folder identifier, etc.) within the provider network 300 (e.g., as offered by a storage service 316) or external to the provider network 300, a format identifier of the data 318, a language identifier of the language of the data 318, etc. In some embodiments, the request includes an identifier (e.g., from the user 309) of the candidate algorithms(s) 310 themselves within the request.

Responsive to receipt of the request, the custom model system 308 of the machine learning service 330 is invoked and begins operations for training the corresponding type of model. For example, the custom model system 308 may identify what type of model is to be trained (e.g., via analyzing the method call associated with the request), the storage location(s) associated with the data 318 (e.g., training video files 320 and/or labeled defects 322), etc. Thus, the custom model system 308 may retrieve any stored data 318 (e.g., videos) as shown at circle (3), which may be from a storage location within the provider network 300 or external to the provider network 300. In certain embodiments, the custom model system 308 is to then cause encoding service 344 to encode the (e.g., training) video file(s) and/or feature extractor service 346 to extract one or more (e.g., compression) features (e.g., features 140). For example, to train the candidate algorithm(s) 310 on the extracted features, e.g., instead of training the candidate algorithm(s) 310 directly on the training video file(s) 320.

In some embodiments, the training (at circle (4)) of the candidate algorithms 310 includes performing (at optional, dotted circle (4)) candidate algorithms 310 by training service 332 of machine learning service 330 described herein a particular training job (e.g., hyperparameter optimization tuning job), or the like. In some embodiments, the machine learning services 330 includes (at optional, dotted circle (5)) selecting of a proper subset of candidate models from a plurality of candidate algorithms 310 for training by training service 332. In some embodiments, the hosting system 352 (at circle (6)) of the custom model system 308 may make use (at optional, dotted circle (6)) of a hosting service 334 of a machine learning service 330 to deploy a model as a hosted model 336 in association with an endpoint 338 that can receive inference requests from client applications 340A and/or 340B at circle (7), provide the inference requests 360A to the associated hosted model(s) 336, and provide inference results 360B (e.g., a prediction, including, but not limited to, predicted classes, predicted entities, predicted events, etc.) back to applications 340A and/or 340B, which may be executed by one or more computing devices 307 outside of the provider network 300 or by one or more computing devices of a compute service 342 (e.g., hardware virtualization service, serverless code execution service, etc.) within the provider network 300. Inference results 360B may be displayed to a user (e.g., in a graphical user interface of the application) and/or exported as a data structure (e.g., in a selected format). The trained model 142 may then be used, e.g., within defect detection system 136.

Figure 4:
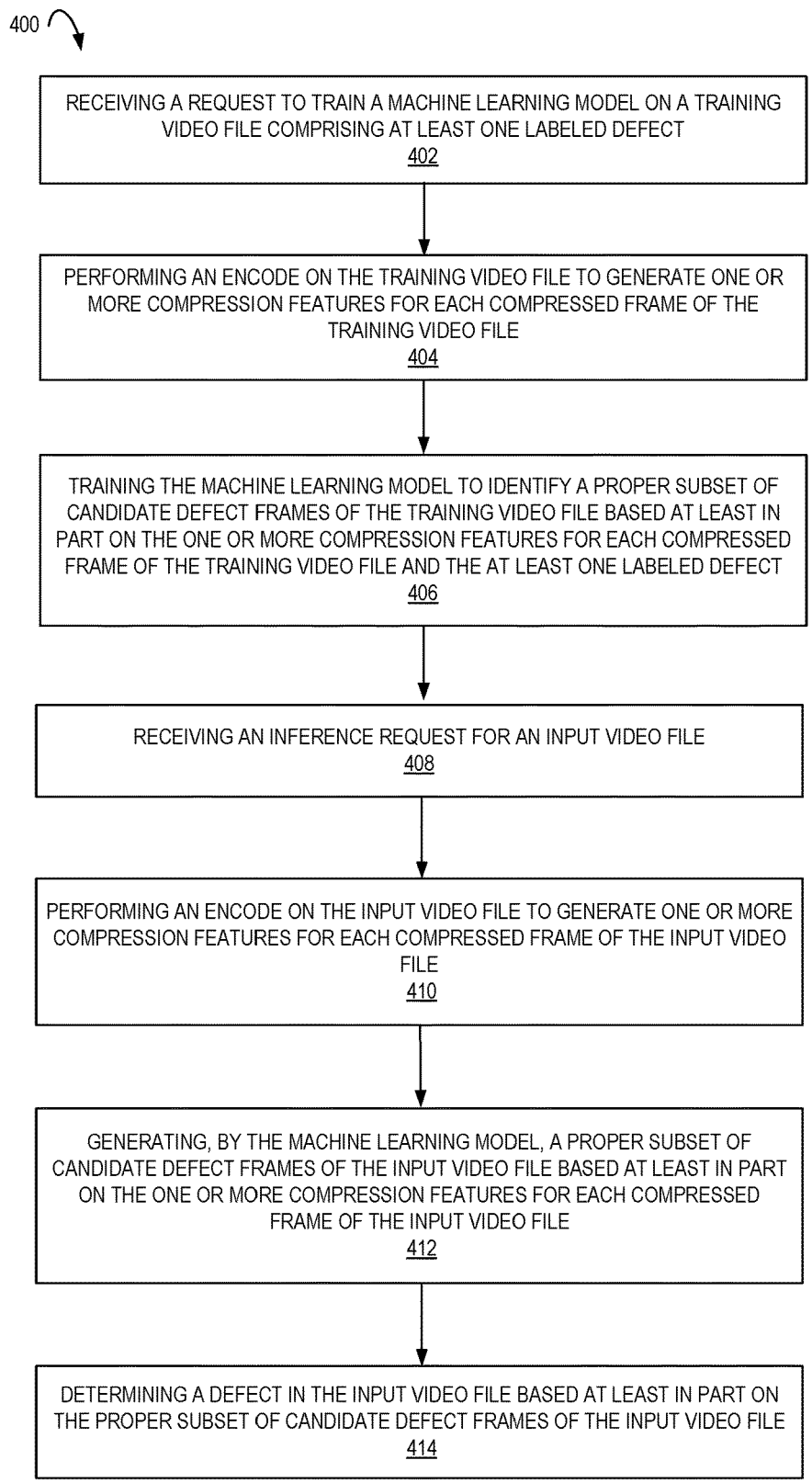
FIG. 4 is a flow diagram illustrating operations of a method for training and using a machine learning model according to some embodiments.

FIG. 4 is a flow diagram illustrating operations 400 of a method for training and using a machine learning model according to some embodiments. Some or all of the operations 400 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400 are performed by a defect detection system 136 or a defect detection service 302 of the other figures.

The operations 400 include, at block 402, receiving a request to train a machine learning model on a training video file comprising at least one labeled defect. The operations 400 further include, at block 404, performing an encode on the training video file to generate one or more compression features for each compressed frame of the training video file. The operations 400 further include, at block 406, training the machine learning model to identify a proper subset of candidate defect frames of the training video file based at least in part on the one or more compression features for each compressed frame of the training video file and the at least one labeled defect. The operations 400 further include, at block 408, receiving an inference request for an input video file. The operations 400 further include, at block 410, performing an encode on the input video file to generate one or more compression features for each compressed frame of the input video file. The operations 400 further include, at block 412, generating, by the machine learning model, a proper subset of candidate defect frames of the input video file based at least in part on the one or more compression features for each compressed frame of the input video file. The operations 400 further include, at block 414, determining a defect in the input video file based at least in part on the proper subset of candidate defect frames of the input video file.

Figure 5:
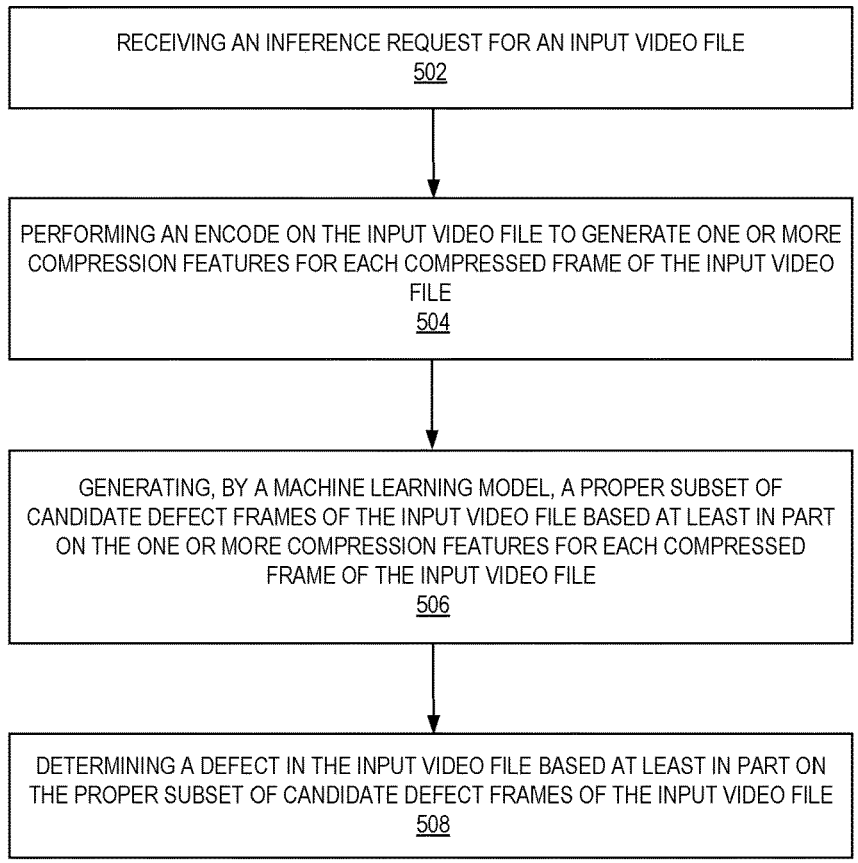
FIG. 5 is a flow diagram illustrating operations of a method for determining a defect in an input video file according to some embodiments.

FIG. 5 is a flow diagram illustrating operations 500 of a method for determining a defect in an input video file according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by a defect detection system 136 or a defect detection service 302 of the other figures.

The operations 500 include, at block 502, receiving an inference request for an input video file. The operations 500 further include, at block 504, performing an encode on the input video file to generate one or more compression features for each compressed frame of the input video file. The operations 500 further include, at block 506, generating, by a machine learning model, a proper subset of candidate defect frames of the input video file based at least in part on the one or more compression features for each compressed frame of the input video file. The operations 500 further include, at block 508, determining a defect in the input video file based at least in part on the proper subset of candidate defect frames of the input video file.

Exemplary environments, systems, etc. that the above may be used in are detailed below.

At least some embodiments of the disclosed technologies can be described in view of the following examples:

Example 1

A computer-implemented method comprising:
receiving a request to train a machine learning model on a training video file comprising at least one labeled defect;
performing an encode on the training video file to generate one or more compression features for each compressed frame of the training video file;
training the machine learning model to identify a proper subset of candidate defect frames of the training video file based at least in part on the one or more compression features for each compressed frame of the training video file and the at least one labeled defect;
receiving an inference request for an input video file;
performing an encode on the input video file to generate one or more compression features for each compressed frame of the input video file;
generating, by the machine learning model, a proper subset of candidate defect frames of the input video file based at least in part on the one or more compression features for each compressed frame of the input video file; and
determining a defect in the input video file based at least in part on the proper subset of candidate defect frames of the input video file.

Example 2

The computer-implemented method of example 1, further comprising triggering a remedial action for the input video file based at least in part on the defect.

Example 3

The computer-implemented method of example 1, further comprising determining a global defect in the input video file based at least in part on the one or more compression features.

Example 4

A computer-implemented method comprising:
receiving an inference request for an input video file;
performing an encode on the input video file to generate one or more compression features for each compressed frame of the input video file;
generating, by a machine learning model, a proper subset of candidate defect frames of the input video file based at least in part on the one or more compression features for each compressed frame of the input video file; and
determining a defect in the input video file based at least in part on the proper subset of candidate defect frames of the input video file.

Example 5

The computer-implemented method of example 4, further comprising triggering a remedial action for the input video file based at least in part on the defect.

Example 6

The computer-implemented method of example 5, wherein the remedial action comprises re-encoding the input video file.

Example 7

The computer-implemented method of example 5, wherein the remedial action comprises requesting another copy of the input video file from a content provider.

Example 8

The computer-implemented method of example 4, wherein the one or more compression features includes a frame complexity for each compressed frame of the input video file.

Example 9

The computer-implemented method of example 4, wherein the one or more compression features includes a frame-level encoding type for each compressed frame of the input video file.

Example 10

The computer-implemented method of example 4, wherein the one or more compression features includes a block-level encoding mode for each compressed frame of the input video file.

Example 11

The computer-implemented method of example 4, further comprising determining a global defect in the input video file based at least in part on the one or more compression features.

Example 12

The computer-implemented method of example 4, further comprising sending the compressed frames of the input video file to a client device when the defect is below a defect threshold.

Example 13

The computer-implemented method of example 4, wherein the generating comprises the machine learning model outputting a frame identification value and a defect probability value for each of the proper subset of candidate defect frames of the input video file.

Example 14

The computer-implemented method of example 4, wherein the generating comprises the machine learning model outputting a first subset of candidate defect frames of the input video file for a first defect category and a second, different subset of candidate defect frames of the input video file for a second, different defect category.

Example 15

A system comprising:
one or more electronic devices to implement a storage service to receive and store an input video file; and
one or more electronic devices to implement a defect detection service, the defect detection service including instructions that upon execution cause the defect detection service to perform operations comprising:
receiving an inference request for the input video file,
performing an encode on the input video file to generate one or more compression features for each compressed frame of the input video file,
generating, by a machine learning model, a proper subset of candidate defect frames of the input video file based at least in part on the one or more compression features for each compressed frame of the input video file, and
determining a defect in the input video file based at least in part on the proper subset of candidate defect frames of the input video file.

Example 16

The system of example 15, wherein the instructions upon execution cause the defect detection service to further perform operations comprising triggering a remedial action for the input video file based at least in part on the defect.

Example 17

The system of example 15, wherein the instructions upon execution cause the defect detection service to further perform operations comprising determining a global defect in the input video file based at least in part on the one or more compression features.

Example 18

The system of example 15, wherein the instructions upon execution cause the defect detection service to further perform operations comprising sending the compressed frames of the input video file to a client device when the defect is below a defect threshold.

Example 19

The system of example 15, wherein the instructions upon execution cause the defect detection service to perform operations wherein the generating comprises the machine learning model outputting a frame identification value and a defect probability value for each of the proper subset of candidate defect frames of the input video file.

Example 20

The system of example 15, wherein the instructions upon execution cause the defect detection service to perform operations wherein the generating comprises the machine learning model outputting a first subset of candidate defect frames of the input video file for a first defect category and a second, different subset of candidate defect frames of the input video file for a second, different defect category.

Figure 6:
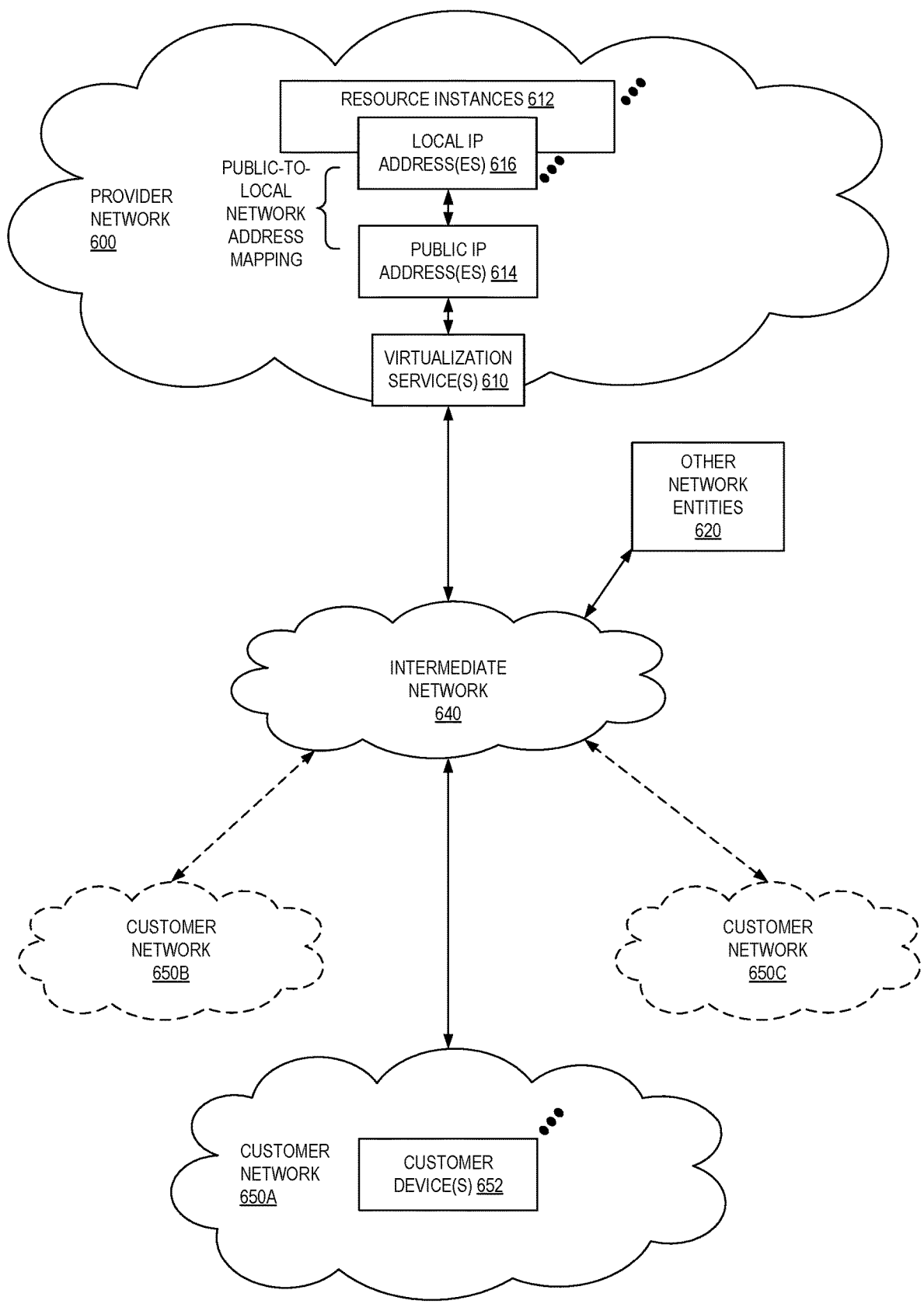
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
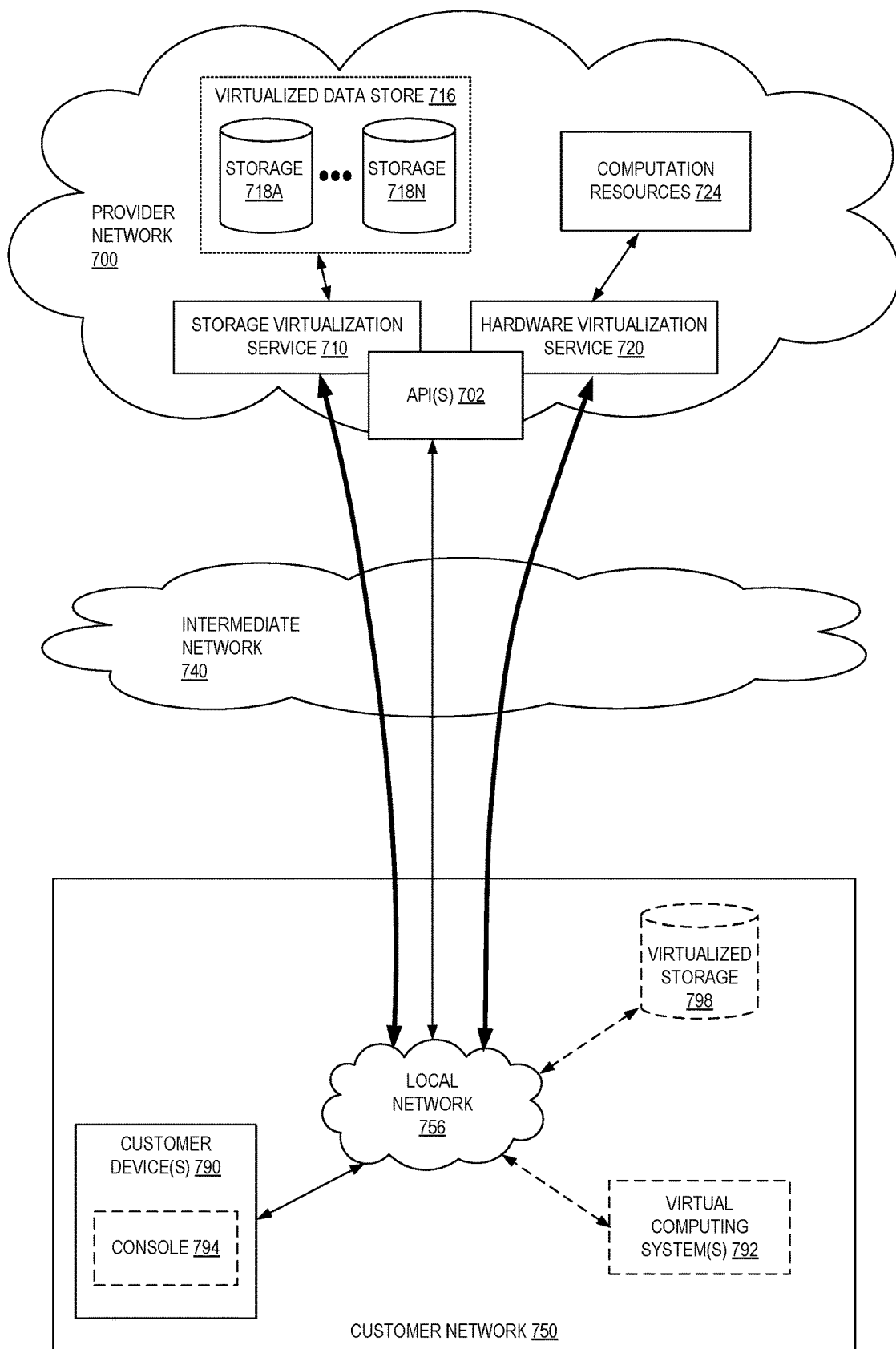
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative System

Figure 8:
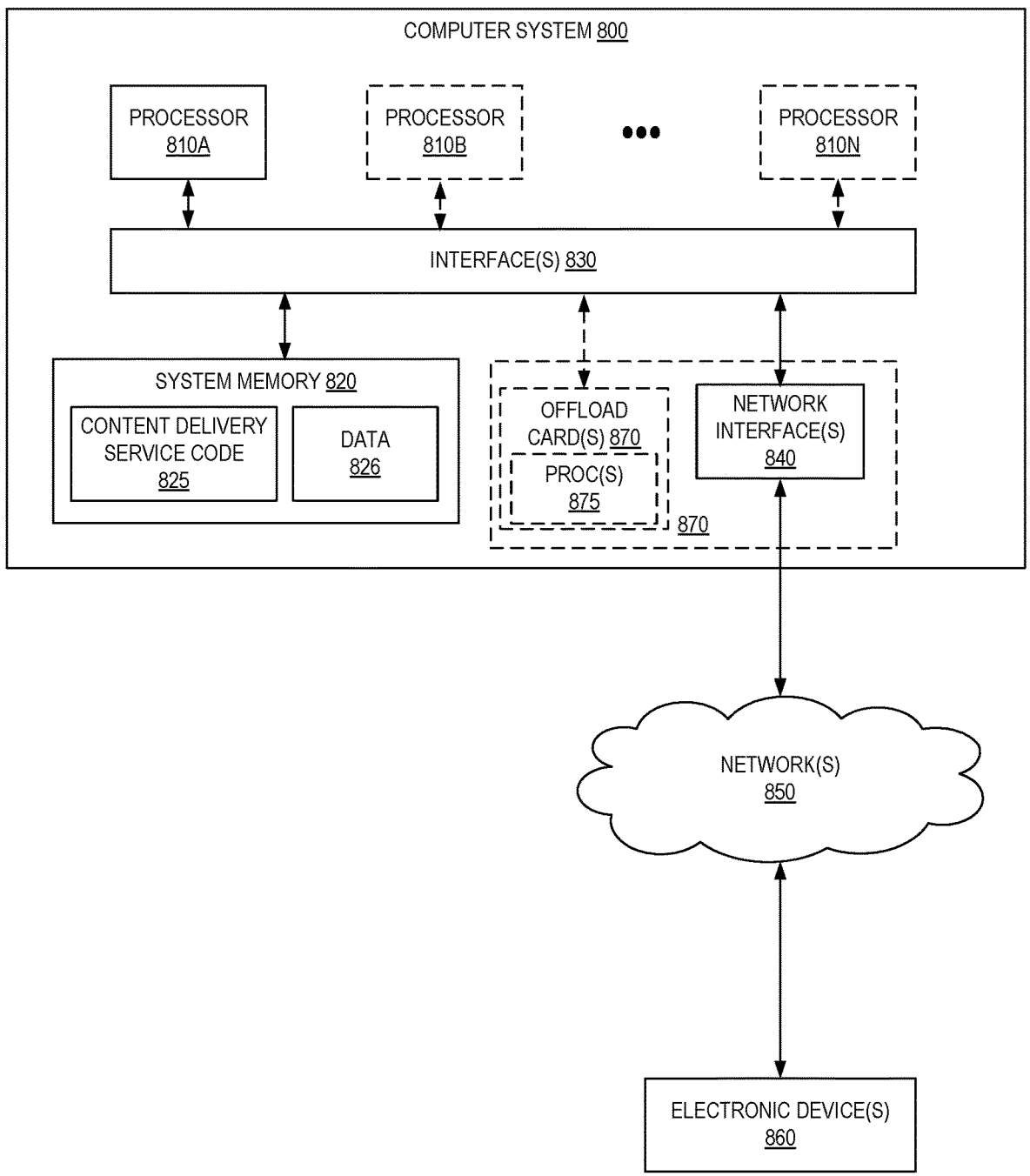
FIG. 8 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as content delivery service code 825 (e.g., detect detection code) and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Figure 9:
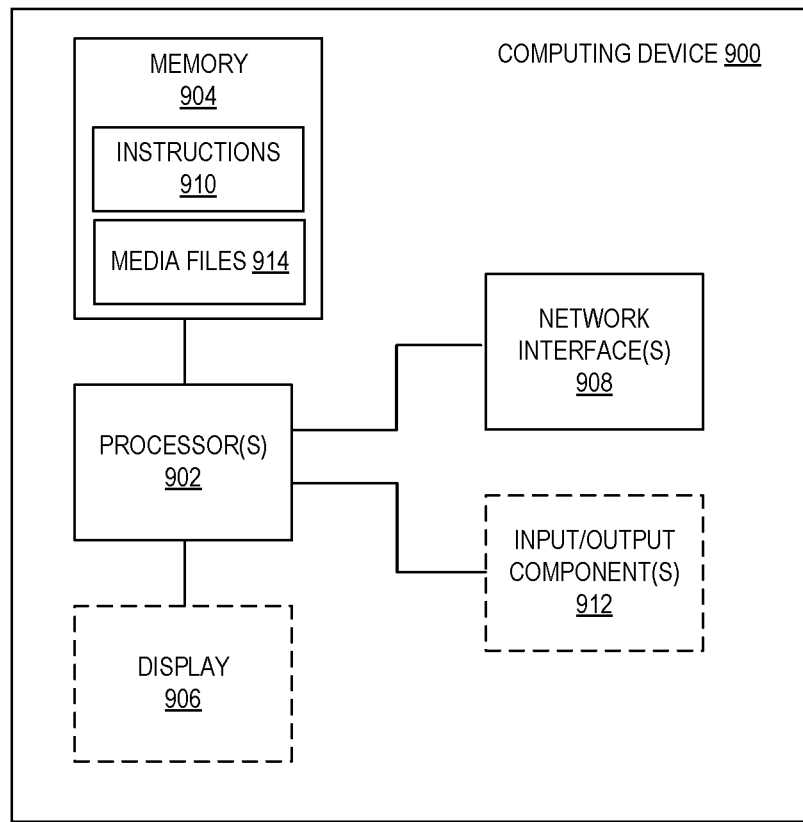
FIG. 9 illustrates a logical arrangement of a set of general components of an exemplary computing device that can be utilized in accordance with various embodiments.

FIG. 9 illustrates a logical arrangement of a set of general components of an example computing device 900. Generally, a computing device 900 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 902 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 904) to store code (for example, instructions 910, e.g., which implement a scaling service as disclosed herein) and/or media files 914 (e.g., generated by encoder 110 in FIG. 1), and a set of one or more wired or wireless network interfaces 908 allowing the electronic device to transmit data to and receive data from other computing devices, typically across one or more networks (e.g., Local Area Networks (LANs), the Internet). For example, where computing device 900 is an instance of client device 118 in FIG. 1, e.g., and is coupled via network interface(s) 908 to content delivery system 102 in FIG. 1. The coupling of the set of processors and other components is typically through one or more interconnects within the electronic device, (e.g., busses and possibly bridges). Thus, the non-transitory machine-readable storage media (e.g., memory 904) of a given electronic device typically stores code (e.g., instructions 910) for execution on the set of one or more processors 902 of that electronic device. One or more parts of various embodiments may be implemented using different combinations of software, firmware, and/or hardware.

A computing device 900 can include some type of display element 906, such as a touch screen or liquid crystal display (LCD), although many devices such as portable media players might convey information via other means, such as through audio speakers, and other types of devices such as server end stations may not have a display element 906 at all. As discussed, some computing devices used in some embodiments include at least one input and/or output component(s) 912 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 10:
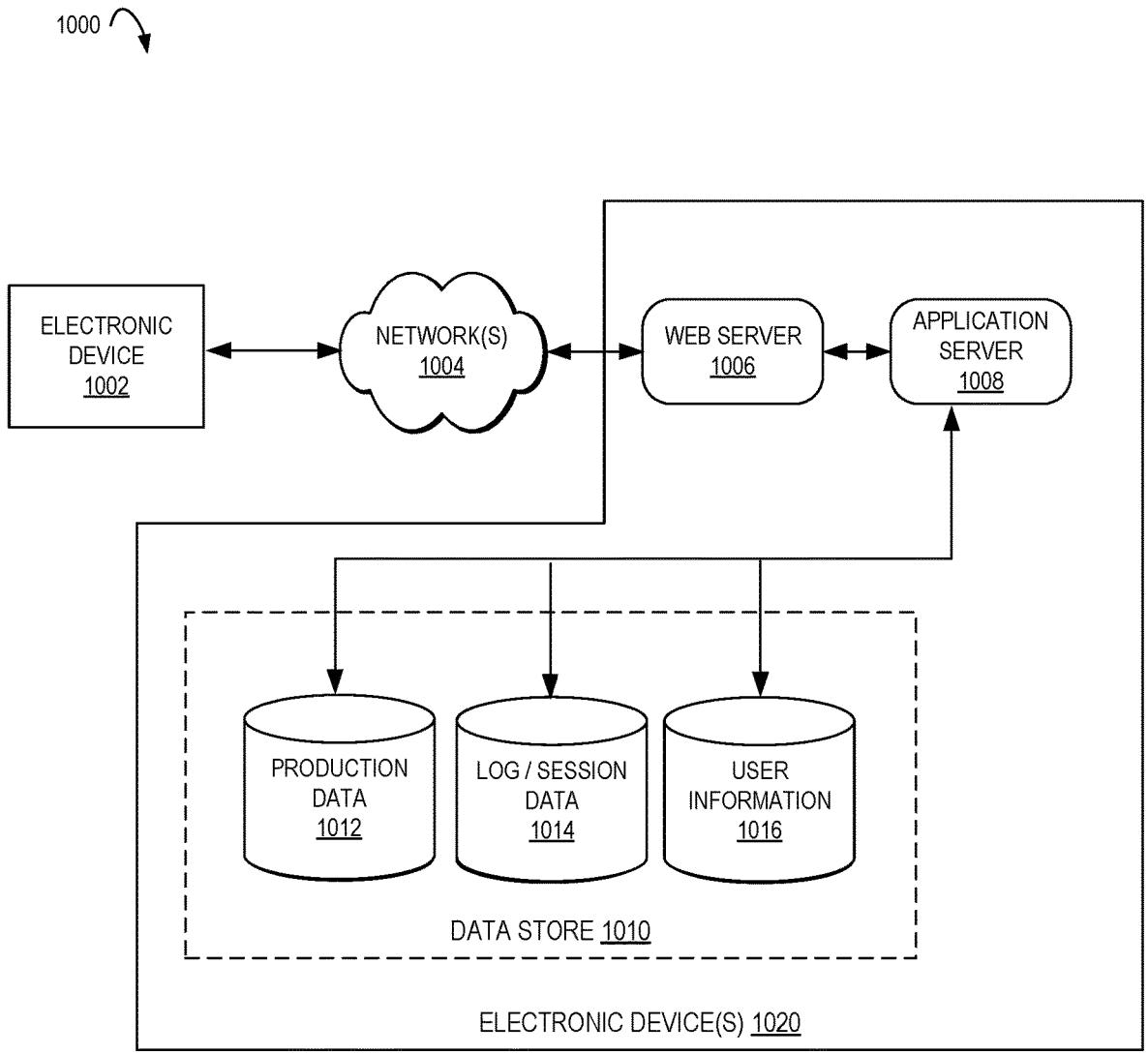
FIG. 10 illustrates an example of an environment for implementing aspects in accordance with various embodiments.

As discussed, different approaches can be implemented in various environments in accordance with the described embodiments. For example, FIG. 10 illustrates an example of an environment 1000 for implementing aspects in accordance with various embodiments. For example, in some embodiments messages are HyperText Transfer Protocol (HTTP) requests that are received by a web server (e.g., web server 1006), and the users, via electronic devices, may interact with the provider network via a web portal provided via the web server 1006 and application server 1008. As will be appreciated, although a web-based environment is used for purposes of explanation, different environments may be used, as appropriate, to implement various embodiments. The system includes an electronic client device 1002, which may also be referred to as a client device and can be any appropriate device operable to send and receive requests, messages or information over an appropriate network 1004 and convey information back to a user of the device 1002. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1004 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1004 includes the Internet, as the environment includes a web server 1006 for receiving requests and serving content in response thereto, although for other networks an alternative device serving a similar purpose could be used, as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device 1002 and handling a majority of the data access and business logic for an application. The application server 1008 provides access control services in cooperation with the data store 1010 and is able to generate content such as text, graphics, audio, video, etc., to be transferred to the client device 1002, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1002 and the application server 1008, can be handled by the web server 1006. It should be understood that the web server 1006 and application server 1008 are not required and are merely example components, as structured code discussed herein can be executed on any appropriate device or host machine as discussed elsewhere herein.

The data store 1010 can include several separate data tables, databases, or other data storage mechanisms and media for storing data relating to a particular aspect. For example, the data store illustrated includes mechanisms for storing production data 1012 and user information 1016, which can be used to serve content for the production side. The data store 1010 also is shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. In one example, a user might submit a search request for a certain type of item. In this case, the data store 1010 might access the user information 1016 to verify the identity of the user and can access a production data 1012 to obtain information about items of that type. The information can then be returned to the user, such as in a listing of results on a web page that the user is able to view via a browser on the user device 1002. Information for a particular item of interest can be viewed in a dedicated page or window of the browser.

The web server 1006, application server 1008, and/or data store 1010 may be implemented by one or more electronic devices 1020, which can also be referred to as electronic server devices or server end stations, and may or may not be located in different geographic locations. Each of the one or more electronic devices 1020 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a request to train a machine learning model on a training video file comprising at least one labeled defect;
performing an encode on the training video file to generate compressed frames of the training video file by a compression of the training video file, and one or more compression features from the compression of the training video file;
training the machine learning model to identify a proper subset of candidate defect frames of the training video file based at least in part on the one or more compression features from the compression of the training video file and the at least one labeled defect;
receiving an inference request for an input video file;
performing an encode on the input video file to generate compressed frames of the input video file by a compression of the input video file, and one or more compression features from the compression of the input video file;
generating, by the machine learning model, a proper subset of candidate defect frames of the input video file based at least in part on the one or more compression features from the compression of the input video file; and
determining a defect in the input video file based at least in part on the proper subset of candidate defect frames of the input video file.

2. The computer-implemented method of claim 1, further comprising triggering a remedial action for the input video file based at least in part on the defect.

3. The computer-implemented method of claim 1, further comprising determining a global defect in the input video file based at least in part on the one or more compression features.

4. A computer-implemented method comprising:
receiving an inference request for an input video file;
performing an encode on the input video file to generate one or more compressed frames of the input video file by a compression of the input video file, and one or more compression features from the compression of the input video file;
generating, by a machine learning model, a proper subset of candidate defect frames of the input video file based at least in part on the one or more compression features from the compression of the input video file; and
determining a defect in the input video file based at least in part on the proper subset of candidate defect frames of the input video file.

5. The computer-implemented method of claim 4, further comprising triggering a remedial action for the input video file based at least in part on the defect.

6. The computer-implemented method of claim 5, wherein the remedial action comprises re-encoding the input video file.

7. The computer-implemented method of claim 5, wherein the remedial action comprises requesting another copy of the input video file from a content provider.

8. The computer-implemented method of claim 4, wherein the one or more compression features includes a frame complexity for each compressed frame of the input video file.

9. The computer-implemented method of claim 4, wherein the one or more compression features includes a frame-level encoding type for each compressed frame of the input video file.

10. The computer-implemented method of claim 4, wherein the one or more compression features includes a block-level encoding mode for each compressed frame of the input video file.

11. The computer-implemented method of claim 4, further comprising determining a global defect in the input video file based at least in part on the one or more compression features.

12. The computer-implemented method of claim 4, further comprising sending the one or more compressed frames of the input video file to a client device when the defect is below a defect threshold.

13. The computer-implemented method of claim 4, wherein the generating comprises the machine learning model outputting a frame identification value and a defect probability value for each of the proper subset of candidate defect frames of the input video file.

14. The computer-implemented method of claim 4, wherein the generating comprises the machine learning model outputting a first subset of candidate defect frames of the input video file for a first defect category and a second, different subset of candidate defect frames of the input video file for a second, different defect category.

15. A system comprising:
one or more electronic devices to implement a storage service to receive and store an input video file; and
one or more electronic devices to implement a defect detection service, the defect detection service including instructions that upon execution cause the defect detection service to perform operations comprising:
receiving an inference request for the input video file,
performing an encode on the input video file to generate one or more compressed frames of the input video file by a compression of the input video file, and one or more compression features from the compression of the input video file,
generating, by a machine learning model, a proper subset of candidate defect frames of the input video file based at least in part on the one or more compression features from the compression of the input video file, and
determining a defect in the input video file based at least in part on the proper subset of candidate defect frames of the input video file.

16. The system of claim 15, wherein the instructions upon execution cause the defect detection service to further perform operations comprising triggering a remedial action for the input video file based at least in part on the defect.

17. The system of claim 15, wherein the instructions upon execution cause the defect detection service to further perform operations comprising determining a global defect in the input video file based at least in part on the one or more compression features.

18. The system of claim 15, wherein the instructions upon execution cause the defect detection service to further perform operations comprising sending the one or more compressed frames of the input video file to a client device when the defect is below a defect threshold.

19. The system of claim 15, wherein the instructions upon execution cause the defect detection service to perform operations wherein the generating comprises the machine learning model outputting a frame identification value and a defect probability value for each of the proper subset of candidate defect frames of the input video file.

20. The system of claim 15, wherein the instructions upon execution cause the defect detection service to perform operations wherein the generating comprises the machine learning model outputting a first subset of candidate defect frames of the input video file for a first defect category and a second, different subset of candidate defect frames of the input video file for a second, different defect category.

* * * * *